Aug. 4, 1931.   J. W. McNAIRY   1,817,756
CONTROL SYSTEM
Filed Nov. 21, 1928
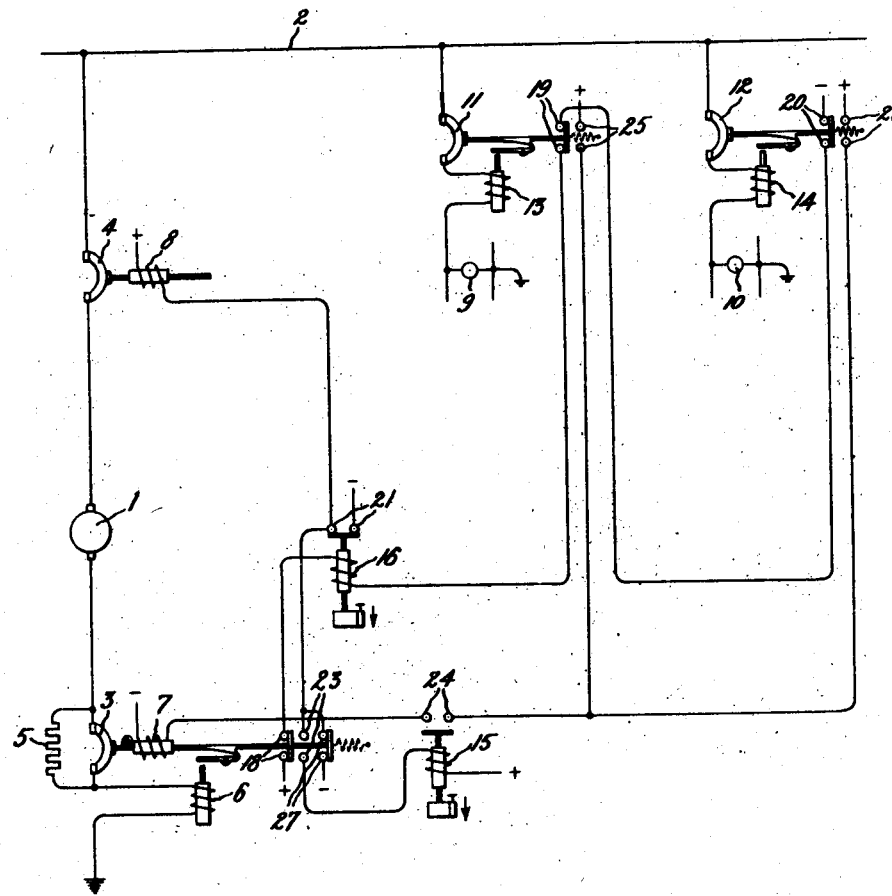
Inventor:
Jacob W. McNairy,
by Charles E. Tullar
His Attorney.

Patented Aug. 4, 1931

1,817,756

UNITED STATES PATENT OFFICE

JACOB W. McNAIRY, OF ERIE, PENNSYLVANIA, ASSIGNOR TO GENERAL ELECTRIC COMPANY, A CORPORATION OF NEW YORK

CONTROL SYSTEM

Application filed November 21, 1928. Serial No. 320,928.

My invention relates to control systems and particularly to an arrangement for automatically controlling the connection between a source of current and a bus to which are connected one or more feeder circuits.

In some systems of distribution it is customary to provide two circuit breakers between a source and a load bus, one of these circuit breakers being arranged to control a shunt around a current limiting device in series between the source and the bus and other of the circuit breakers being arranged to connect the source directly to the bus. Each feeder is also provided with an overload circuit breaker.

One object of my invention is to provide in such a system an arrangement whereby a fault on any feeder effects the opening of the circuit breaker in the faulty feeder and also the opening and the immediate reclosing of the circuit breaker which shunts the current limiting device in the circuit of the source without effecting the opening of the other circuit breaker between the source and the bus.

Another object of my invention is to provide in such a system an arrangement whereby a fault on the bus effects the opening of both of the circuit breakers which are in series between the source and the bus and prevents reclosure of the circuit breaker which shunts the current limiting device.

Another object of my invention is to provide an arrangement whereby both of the circuit breakers between the source and the bus are opened and the reclosing of the circuit breaker which shunts the current limiting device is prevented whenever this last mentioned circuit breaker is opened after any feeder breaker has remained in its open position for a predetermined time.

My invention will be better understood from the following description when taken in connection with the accompanying drawing and its scope will be pointed out in the appended claims.

Referring to the accompanying drawing which diagrammatically shows a system of electric distribution embodying my invention, 1 represents a suitable source of current such as a direct current generator which is arranged to be connected to a suitable load bus 2 by means of two circuit breakers 3 and 4. As shown in the drawing, one side of the bus is the ground and the circuit breaker 3 is connected between one terminal of the generator 1 and the ground and the circuit breaker 4 is connected between the other terminal of the generator and the ungrounded side of the bus 2. In practice the circuit breaker 3 is usually connected between the negative terminal of the generator and ground and the circuit breaker 4 is connected between the positive terminal of the generator and the ungrounded side of the bus. The circuit breaker 7 when closed completes a shunt around a suitable current limiting device 5 such as a resistor so that when the circuit breaker is open under short circuit conditions on the bus the current output of the generator 1 is limited to a predetermined safe value.

The circuit breakers 3 and 4 may be of any suitable type examples of which are well known in the art. In practice, circuit breaker 3 and probably circuit breaker 4 would be of the well known high speed type. In order to simplify the disclosure, however, the circuit breaker 3 is shown in the drawing as a latched-in circuit breaker which is provided with an overcurrent trip coil 6 and a closing coil 7 and the circuit breaker 4 is shown as a contactor which is provided with a coil 8. The overcurrent trip coil 6 is connected in any suitable manner so that it is energized in accordance with the current flowing through the generator 1 and is arranged to effect the opening of the circuit breaker 3 when the current through the generator 1 exceeds a predetermined value.

9 and 10 represent feeders which are arranged to be connected across the bus 2 by overload circuit breakers 11 and 12 respectively which may be of any suitable type examples of which are well known in the art. As shown in the drawing, the circuit breakers 11 and 12 are of the well known latched-in type and are provided with the overload coils 13 and 14 respectively which are connected in any suitable manner so that they are energized in response to the currents flowing through the load circuits 9 and 10 respectively.

In order to effect the automatic reclosing of the circuit breaker 3 after it has been opened by a fault on any one of the feeders, I provide a control relay 15 which is so connected that when it is energized and any feeder breaker is open a circuit is completed for the closing coil 7 to close the circuit breaker 3. The energizing circuit of the relay 15, however, is also controlled by a time relay 16 which, in turn, is controlled by the positions of the circuit breakers 11 and 12 so that if any of these circuit breakers remains open more than a predetermined time for any reason whatever, the subsequent opening of the circuit breaker 3 is prevented from effecting the energization of the control relay 15 and the immediate reclosing of the circuit breaker 3. The time relay 16 may be of any suitable type examples of which are well known in the art. In the particular arrangement disclosed in the drawing, this relay is designed so that it does not open its contacts until after its coil has been deenergized for a predetermined time.

The circuit of the coil 8 of the circuit breaker 4 is also controlled by the time relay 16 and by the circuit breaker 3 so that whenever the circuit breaker 3 is open and the time relay 16 is in a position to prevent the automatic reclosing of the circuit breaker 3, the circuit breaker 4 is opened to disconnect the generator 1 from the bus 2.

The operation of the arrangement shown in the drawing is as follows:

Under normal operating conditions all of the circuit breakers are closed, the circuit breakers 3, 11 and 12 being held in their closed positions by their respective latches. Under these conditions, a circuit is completed for the coil of the time relay 16 through auxiliary contacts 18 on the circuit breaker 3 and the auxiliary contacts 19 and 20 on the circuit breakers 11 and 12 respectively. The relay 16 by maintaining its contacts 21 closed, maintains the energizing circuit of the closing coil 8 completed so that the circuit breaker 4 is held in its closed position.

Let it be assumed now that a fault occurs on one of the feeders, such for example as feeder 9, which causes both of the overcurrent trip coils 6 and 13 to effect the opening of their respective breakers 3 and 11. The opening of the circuit breaker 11 interrupts at its auxiliary contacts 19 the above traced circuit for the coil of the time relay 16 but due to the construction of this relay it does not open its contacts 21 until after the relay coil has been deenergized a predetermined length of time. Therefore, the circuit breaker 4 remains closed after the opening of the circuit breakers 3 and 11 so that current is still supplied to the other feeders which are connected across the bus 2.

When the circuit breaker 3 opens a circuit is completed for the coil of the control relay 15 through the auxiliary contacts 23 on the circuit breaker 3 and the contacts 21 of the time relay 16. The control relay 15 by closing its contact 24 completes through the auxiliary contacts 25 of the open feeder breaker 11 a circuit for the closing coil 7 so as to effect the immediate reclosing of the circuit breaker 3.

The circuit breaker 11 may be reclosed either by hand or automatically in any suitable manner examples of which are well known in the art. As soon as the circuit breaker 11 is reclosed, the above traced circuit for the coil of the time relay 16 is again completed through the auxiliary contacts 19 on the circuit breaker 11.

When a fault occurs on the feeder 10 which causes the opening of both of the circuit breakers 3 and 12, the operation is the same as above described except that the circuit of the closing coil 7 is completed through the auxiliary contacts 26 on the circuit breaker 12 instead of through the auxiliary contacts 25 on the circuit breaker 11.

Therefore, it will be observed that when a predetermined fault occurs on any feeder, the breaker in the feeder is opened and the circuit breaker 3 is opened and immediately reclosed.

Let it be assumed now that a fault occurs on the bus 2. Under these conditions only the overcurrent trip coil 6 operates to effect the opening of its associated circuit breaker 3. When the circuit breaker 3 opens the above traced circuit for the control relay 15 is completed so that the control relay closes its contacts 24. The above traced circuit for the closing coil 7, however, is not completed since neither of the feeder breakers is open. Therefore, further automatic reclosing of the circuit breaker 3 is prevented until one of the feeder breakers is opened.

Furthermore, the circuit breaker 3 by opening its auxiliary contacts 18 interrupts the above traced circuit for the time relay 16 so that after the circuit breaker 3 has remained open for a predetermined time the relay 16 opens its contacts 21 and thereby interrupts the circuit of the coil 8 of the circuit breaker 4. The deenergization of the coil 8 effects the opening of the circuit breaker 4 so that the generator 1 is disconnected from across the bus 2. Therefore, it will be observed that whenever a fault occurs on the bus 2, the circuit breaker 3 is opened to insert the resistor 5 in series between the generator 1 and the bus 2 and subsequently the circuit breaker 4 is opened to disconnect the generator 1 from across the bus 2.

Let it be assumed now that for some reason one of the feeder breakers remains open for a sufficient length of time to allow the time relay 16 to open its contacts 21. The opening of the contacts 21 under these conditions does not effect the deenergization of the coil 8 of the circuit breaker 4 because the circuit of the coil 8 is still maintained through the auxiliary contacts 27 on the circuit breaker 3. When, however, the circuit breaker 3 is opened due to a fault on either the bus 2 or on one of the feeders connected across the bus 2, the opening of the auxiliary contacts 27 on this circuit breaker 3 effects the immediate deenergization of the coil 8 and the opening of the circuit breaker 4. Since the contacts 21 of the time relay 16 are open under the conditions assumed, the relay 15 is not energized in response to the opening of the circuit breaker 3 and, therefore, the circuit breaker is not automatically reclosed.

While I have, in accordance with the Patent Statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, a source of current, a bus, a circuit breaker between said source and bus, current limiting means arranged to be inserted between said source and bus when said circuit breaker is open, a second circuit breaker between said source and bus, a feeder, a circuit breaker between said bus and feeder, means responsive to a fault on said feeder for opening said first mentioned circuit breaker and said feeder circuit breaker and for subsequently reclosing said first mentioned circuit breaker, and means responsive to a fault on said bus for effecting the opening of both of said circuit breakers between said source and bus.

2. In combination, a source of current, a bus, a circuit breaker between said source and bus, current limiting means arranged to be inserted between said source and bus when said circuit breaker is open, a second circuit breaker between said source and bus, a feeder, a circuit breaker between said bus and feeder, means responsive to a fault on said feeder for opening said first mentioned circuit breaker and said feeder circuit breaker and for subsequently reclosing said first mentioned circuit breaker, and means responsive to a fault on said bus for effecting the immediate opening of said first mentioned circuit breaker and the opening of said second mentioned circuit breaker after a predetermined time delay and for preventing the reclosing of said first mentioned circuit breaker.

3. In combination, a source of current, a bus, a circuit breaker between said source and bus, current limiting means arranged to be inserted between said source and bus when said circuit breaker is open, a second circuit breaker between said source and bus, a feeder, a circuit breaker between said bus and feeder, means responsive to a fault on said feeder for opening said first mentioned circuit breaker and said feeder circuit breaker, means including means controlled by said first mentioned circuit breaker for effecting the reclosing thereof when it is open, and timing means responsive to the opening of said first mentioned circuit breaker for effecting the opening of said second mentioned circuit breaker when said first mentioned circuit breaker remains open for a predetermined time and for rendering said reclosing means inoperative.

4. In combination, a source of current, a bus, a circuit breaker between said source and bus, current limiting means arranged to be inserted between said source and bus when said circuit breaker is open, a second circuit breaker between said source and bus, a feeder, a circuit breaker between said bus and feeder, means responsive to a fault on said feeder for opening said first mentioned circuit breaker and said feeder circuit breaker, means controlled by said first mentioned circuit and said feeder circuit breaker for effecting the immediate reclosing of said first mentioned circuit breaker when it is open and said feeder circuit breaker is also open, and timing means responsive to the position of said feeder circuit breaker for rendering said reclosing means inoperative to reclose said first mentioned circuit breaker when it opens subsequently to said feeder circuit breaker having remained open for a predetermined time.

5. In combination, a source of current, a bus, a circuit breaker between said source and bus, a feeder, a circuit breaker between said bus and feeder, means responsive to a fault on said feeder for effecting the opening of both of said circuit breakers, means normally arranged to effect the immediate reclosing of said first mentioned circuit breaker in response to the opening thereof, and timing means controlled by said feeder circuit breaker for rendering said reclosing means inoperative after said feeder circuit breaker has remained open for a predetermined time.

6. In combination, an electric circuit, two circuit breakers connected in series in said circuit, means for effecting the opening of each of said circuit breakers, means including means responsive to the opening of one of said circuit breakers for effecting the reclosing thereof, and timing means responsive to the opening of the other of said circuit breakers for rendering said reclosing means inoperative after said other of said circuit breakers has remained open for a predetermined time.

7. In combination, an electric circuit, two circuit breakers connected in series in said circuit, means for effecting the opening of each of said circuit breakers, means responsive to the opening of both of said circuit breakers for effecting the reclosing of one of said circuit breakers, and timing means responsive to the opening of the other of said circuit breakers for rendering said reclosing means inoperative after said other of said circuit breakers has remained open for a predetermined time.

8. In combination, a source of current, a bus, a circuit breaker between said source and bus, current limiting means arranged to be inserted between said source and bus when said circuit breaker is open, a second circuit breaker between said source and bus, a feeder, a circuit breaker between said bus and feeder, means responsive to a fault on said bus for effecting the opening of said first mentioned circuit breaker and the subsequent opening of said second mentioned circuit breaker after a predetermined time when said feeder circuit breaker is closed and the immediate opening of said second circuit breaker if said feeder circuit breaker has been open a predetermined time when said first mentioned circuit breaker opens.

9. In combination, a source of current, a bus, a circuit breaker between said source and bus, current limiting means arranged to be inserted between said source and bus when said circuit breaker is open, a second circuit breaker between said source and bus, a feeder, a circuit breaker between said bus and feeder, means for effecting the opening of said first mentioned circuit breaker, and means controlled by said first mentioned circuit breaker and said feeder circuit breaker for effecting under certain conditions the immediate opening of said second circuit breaker after the opening of said first mentioned circuit breaker and under other conditions the opening of said second circuit breaker after said first mentioned circuit breaker has remained open a predetermined time.

In witness whereof, I have hereunto set my hand this 19th day of November, 1928.

JACOB W. McNAIRY.